(147.)

EDWARD M. DEEY.
Steam Heating Apparatus Combined with a Range.

No. 122,710. Patented Jan. 16, 1872.

2 Sheets--Sheet 1.

Witnesses:

Inventor:

EDWARD M. DEEY.
Steam Heating Apparatus Combined with a Range.
No. 122,710. Patented Jan. 16, 1872.

122,710

UNITED STATES PATENT OFFICE.

EDWARD MORTIMER DEEY, OF NEW YORK, N. Y.

IMPROVEMENT IN STEAM-HEATING APPARATUS COMBINED WITH A RANGE.

Specification forming part of Letters Patent No. 122,710, dated January 16, 1872.

Specification describing certain Improvements in Heating, Ventilating, and Cooking Apparatus for Dwellings, invented by EDWARD MORTIMER DEEY, of the city, county, and State of New York.

The object of my invention is to supply dwellings with a pleasant and healthy atmosphere at the least possible expense. This is done by the introduction of pure cold air into an air-chamber, where it is heated without contact of red-hot or superheated surfaces by means of fire, water, and steam, and by means of air and steam-pipes is conducted to the apartments to be heated, and inducted into the rooms by steam-drums placed in front of the hot-air registers, the steam-drum serving also to radiate heat and supply vapor of water to the room. The fire in the grate is surrounded with corrugated water-backs, which receive and transmit its heat through hot water, steam-pipes, and steam-chests arranged in the air-chamber, and thus, by the aid of a hot-air box, (through which the flue passes at the lower part of the air-chamber,) the air is heated to about 200°, and this temperature is maintained as it passes through the air-tubes by means of the contained steam-pipes and steam-drum. This mode utilizes nearly all the heat produced by the fuel consumed, and does not vitiate the atmosphere in the process. In addition it may be used in connection with a range by omitting the side water-backs and adjusting a cooking apparatus in their place. The room is ventilated by means of a register near the ceiling in the chimney, and by another near the floor opening into a cold-air tube leading to the hot-air chamber. Water is supplied to the water-backs by means of a reservoir, and the height to which boiling water ascends in the pipes is determined by a floating cock in the reservoir. A boiler may be connected with the water-back by a pipe, and the water heated by a spiral steam-pipe passing through it and terminating in a steam-chest. The boiler may be used as a reservoir. The water-backs are so arranged as that their lowest parts, where the supply-pipes enter, cannot be made red hot by the fire in the grate or endanger explosion from superheated steam. The steam-pipes enter as many steam-chests as there are floors to be heated, so that each floor may have its proportion of steam. The flow of hot air is adjusted by the arrangement of the tubes. The steam-chests are provided with safety-valves, as I will further explain by reference to the accompanying drawing, in which—

Figure 1:
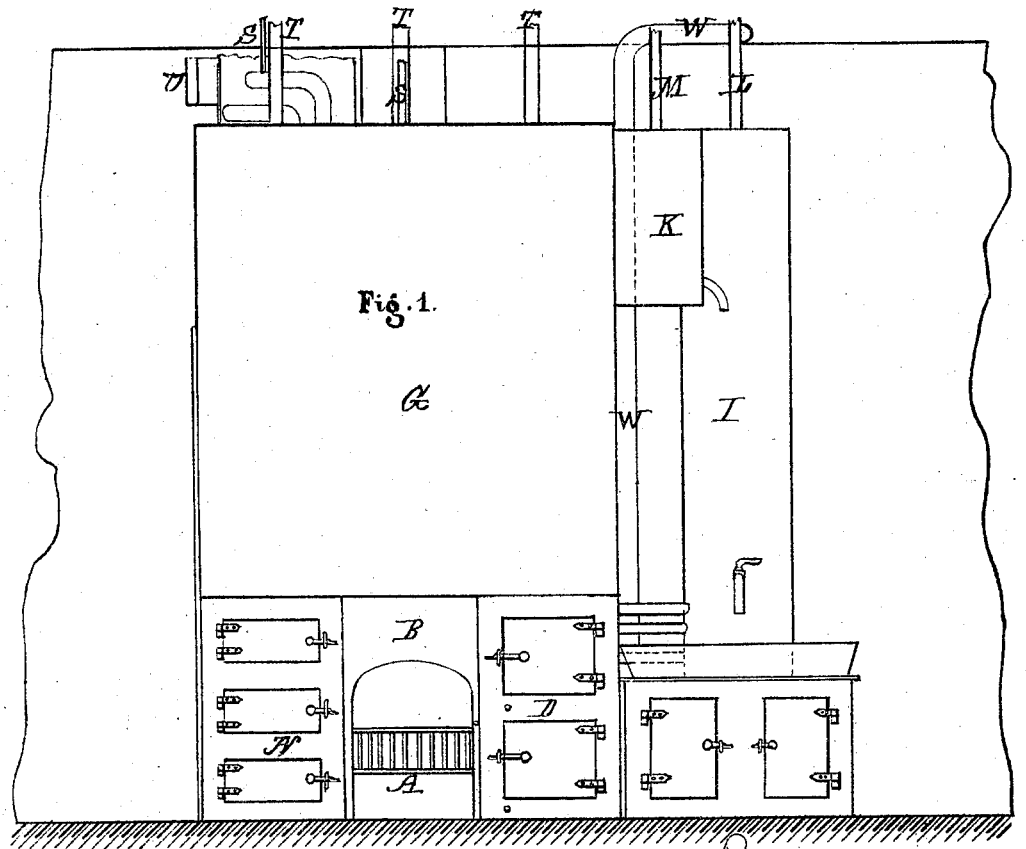
Figure 2:
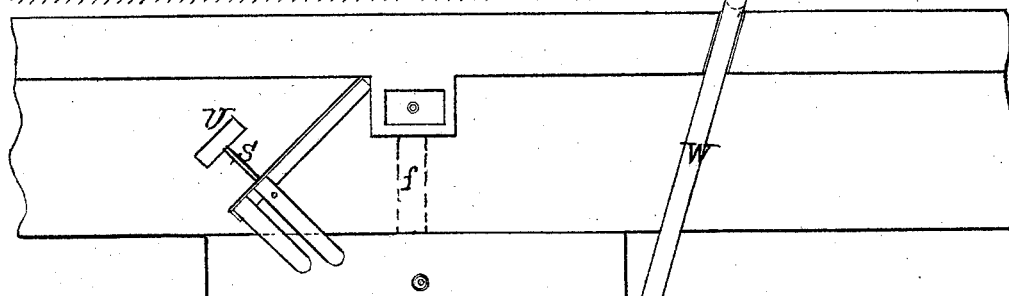
Figure 3:
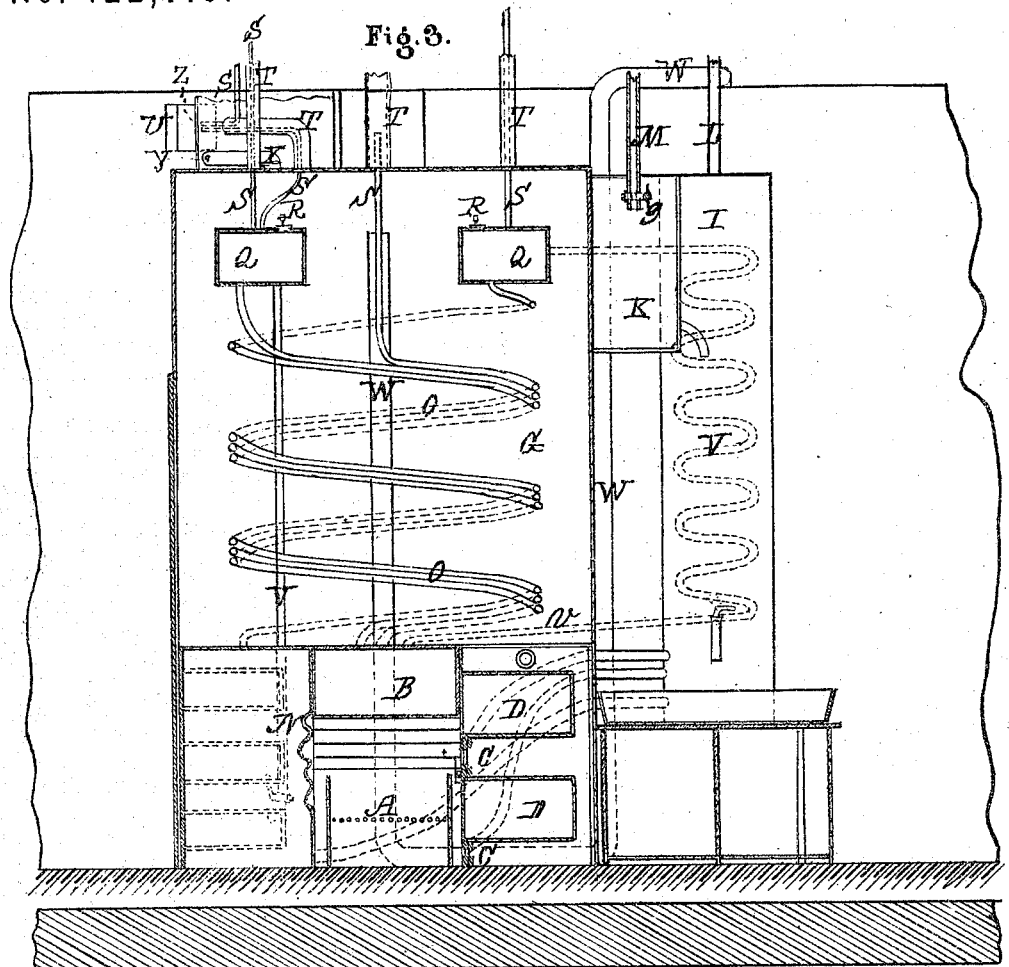
Figure 4:
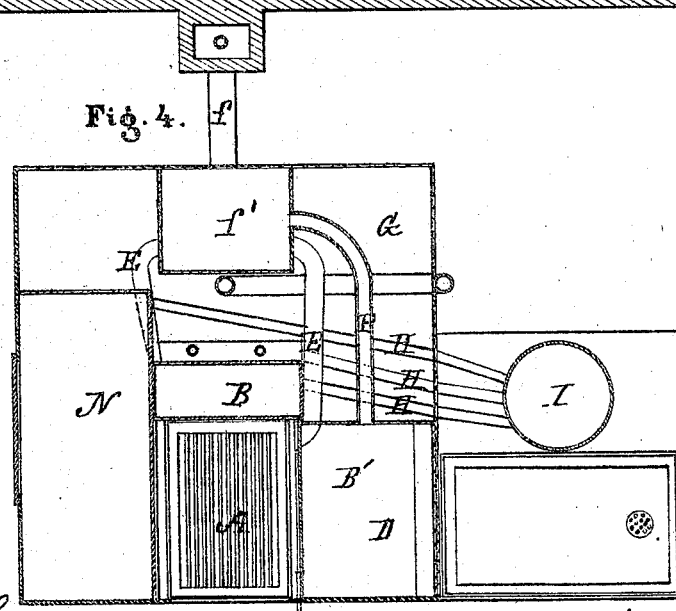

Figure 1 represents a front elevation of my invention, showing kitchen-range, hot-air chamber, water-boiler, and reservoir; Fig. 2, a top view; Fig. 3, a vertical section; and Fig. 4, a horizontal section of same taken above the grate.

In the drawing, A indicates the grate; B B', water-backs; C C, registers for regulating the current of hot air around the ovens D, or for shutting it off both grate and oven; E F, smoke-pipes leading to smoke-box $f'$. G is the hot-air chamber, from which a final smoke-pipe, $f$, leads into the chimney. H H are water-supply pipes for the water-backs B B N, leading from the kitchen-boiler I and from the reservoir K, both of which (I K) are supplied with cold water through the pipes L M, and provided with floating stop-cocks $g$ $g$. N is a water-back, for which cooking apparatus may be substituted if preferred. O O are pipes ascending from the water-backs to the steam-chest Q Q in the upper part of the hot-air chamber G. R R are safety-valves in the steam-chest; S S, steam-pipes passing through hot-air tubes T T to upper rooms, where steam-pipe S enters steam-drum U and thence a place of condensation and discharge in the chimney or elsewhere. V $v$ are hot-water pipes which pass from the water-back B up through the boiler I, and discharge into the steam-chest Q. W is a tube for introducing cold air from without the dwelling through the lower part of the hot-air chamber and discharging it at the upper part, so that it may fall among the hot water and steam pipes, and, after being heated, pass through the hot-air tubes T T, in connection with the contained steam-pipes S S, to the rooms to be heated. X is a cold-air tube extending from the lower part of each room to the hot-air chamber G. Y is a cold-air register, and Z a hot-air register.

By this arrangement apartments are supplied with air containing all its normal elements. The air in the room is made to circulate, the warmth is agreeable, and the air is not vitiated by the admixture of noxious gases or by contact with red-hot or superheated surfaces. This apparatus will give more heat from the same amount of fuel, by the combustion of fire, water, and steam, than can be produced in any other way.

In some respects this invention is similar to one for heating and ventilating dwellings for which I obtained a patent January 10, 1871. In other respects there are important differences and additions, which I now claim as an improvement and desire to secure by Letters Patent, viz:

The grate and water-backs A B B' N, hot-water and steam pipes O O, V v, and S S S, steam-chests Q Q, drum U, oven D, boilers N and I, reservoir K, cold and hot air pipes W T T X, and hot-air chamber G, all constructed, arranged, and operating substantially as and for the purposes set forth.

In testimony whereof I have hereunto set my signature this 27th day of November, 1871.

EDWARD MORTIMER DEEY.

Witnesses:
    ARTHUR NEILL,
    JOHN CANNING. (147)